E. L. P. PAILLIARD-TURENNE.
OCCULTING DEVICE FOR FLASH LIGHTS FOR OPTICAL TELEGRAPHY.
APPLICATION FILED MAY 4, 1911.
1,025,015.
Patented Apr. 30, 1912.
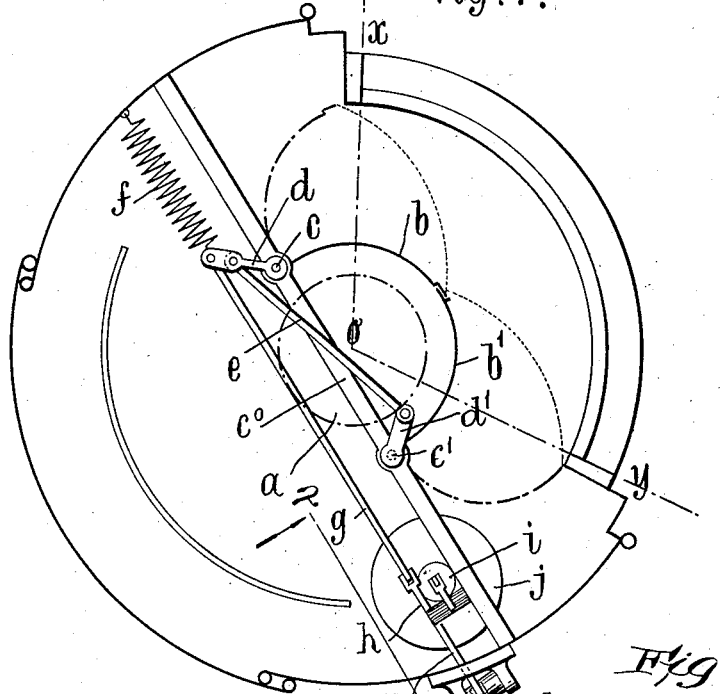
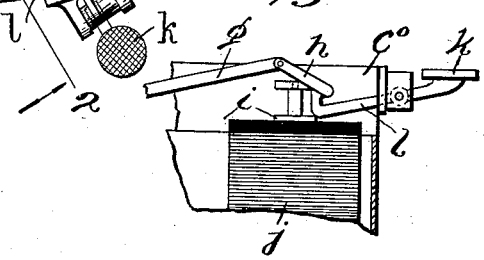

UNITED STATES PATENT OFFICE.

EMILE LEON PAUL PAILLIARD-TURENNE, OF PARIS, FRANCE.

OCCULTING DEVICE FOR FLASH-LIGHTS FOR OPTICAL TELEGRAPHY.

1,025,015. Specification of Letters Patent. Patented Apr. 30, 1912.

Application filed May 4, 1911. Serial No. 625,022.

*To all whom it may concern:*

Be it known that I, EMILE LEON PAUL PAILLIARD-TURENNE, a citizen of the United States, residing at 82 Rue Curial, Paris, in the Department of Seine, Republic of France, have invented new and useful Improvements in Occulting Devices for Flash-Lights for Optical Telegraphy, of which the following is a specification.

The present invention relates to an occulting device which can be fitted to any kind of lantern or flash-light lighted electrically or by other means, which is used for optical telegraphy by the transmission of conventional signs, such as for instance the signals of the ordinary Morse alphabet.

Up to the present the flash-lights employed for the transmission of optical telegraphic signals on board ship have been illuminated by means of an incandescent electric lamp through which a current, which can be cut off at will by means of a suitable commutator, is passed so as to produce luminous flashes of varying duration separated by dark periods corresponding to the dots and dashes which compose the characters of the Morse alphabet, or any other conventional alphabet of the same kind. This method is open to the very serious objection that it does not give well defined signals. As is well known an electric lamp requires a certain interval of time before it reaches its maximum intensity of light or a state of complete darkness, during which time the light increases to a maximum and decreases from the maximum to complete extinction respectively. The consequence of this phenomenon in practice is that it becomes impossible to transmit rapidly and distinctly optical signals composed of long and short flashes corresponding to the dots and dashes of the Morse alphabet for example. Moreover the receiving station can easily be deceived in the signals transmitted, by reason of the indecision existing as to the value of the intensity of the light before it reaches its maximum. The device forming the subject of the present invention obviates these drawbacks completely and permits the use, in optical telegraphy, of electric lamps for the rapid, exact and precise transmission of conventional signals.

The accompanying drawing illustrates, but merely by way of example, an occulting device for an electric lamp constructed according to the invention.

Figure 1 is a plan of a ship's side-light provided with the device, forming the subject of the invention, for transmitting electrical signals. Fig. 2 is a sectional detail view taken on the line 2—2 of Fig. 1.

In the arrangement shown in Fig. 1, $a$ designates an ordinary incandescent electric lamp which remains alight during the entire period of signaling. This lamp is surrounded, on the portion corresponding to the sections $x\ o\ y$ of illumination of the flash-light by obturating shutters $b\ b'$ which follow the conformation of the incandescent lamp and intercept the light when they are in the position shown in Fig. 1. The illuminated section $x\ o\ y$ is substantially equal, in the case represented in the drawing, to 112°. The shutters $b, b'$, are fixed on shafts $c\ c'$ which are pivoted on a rigid cross-bar $c°$ fitted within the casing of the lamp. On the shafts $c\ c'$ are keyed lever arms $d\ d'$ connected together by a link $e$. One end of a coiled spring $f$ is attached to one of these lever arms, to $d$ in this case, and the other end of the spring is attached to a fixed point on the casing of the lamp. This spring acts on the lever arm $d$, and through link $e$, on the lever arm $d'$ and tends to rock the shafts $c\ c'$ so as to bring the shutters into the position shown in full lines in Fig. 1 and thereby intercept the light emitted from lamp $a$. One end of a rod $g$ is hinged to the same arm of the lever $d$ and the other end of the rod is acted upon, through a system of levers $h$ or in any other suitable manner, by the armature or movable core $i$ of an electro-magnet $j$, through which latter an electric current of suitable strength may be made to flow by means, for example, of a Morse key. When a current passes through the electro-magnet $j$ the movable core $i$ is attracted and acts on the rod $g$ which pulls the lever arm $d$ against the action of the spring $f$ and thereby turns the shutters $b$ and $b'$ into the position shown in dotted lines. The lamp $a$ is thereby uncovered and permits the ray of light emitted by it to appear in the section $x, o, y$. When the current ceases to flow through the winding of the electro-magnet the spring $f$ brings the shutters $b\ b'$ back to the position shown in Fig. 1 and thus completely intercepts the passage of the beam of light. It will be easily understood that under these circumstances it is easy to transmit signals composed of long or short flashes corresponding to the dashes and dots of the conventional alphabet used. For this purpose, current is sent, by means of a suitable key during the necessary periods of time through the electromagnet $j$, which in coöperation with the recalling spring $f$ opens and closes the shutters $b$, $b'$, and allows the beam of light emitted by the lamp $a$ to pass or intercepts it.

In case the electro-magnet should get out of order, a mechanical manipulator can be provided outside the lamp, the key $k$ of which can be connected to the rod $g$ by means of a link $l$. In this manner the device can still be used by acting by hand on the key $k$ even if the electro-magnet becomes damaged.

It is obvious that if the flash-light in question is mounted on a pivot so that it can revolve through 360°, it will be easy to dispose the beam of light appearing at $x$, $o$, $y$ so that it can follow a ship in its course and transmit signals thereto.

It will be understood that the invention is not strictly limited to the exact arrangement shown in the accompanying drawings and that it would be possible, without departing from the spirit of the invention, to vary constructional details as practical requirements may show to be necessary or expedient.

I claim:

In an occulting device for flash-lights for optical telegraphy, the combination with a lamp of shutters inclosing one side of same, an arm secured to each shutter, said arms extending in opposite directions, a link connecting the arms, an intermittently operated electro-magnet, a pivoted lever actuated by the electro-magnet, a rod connecting the lever and one of said arms, a spring connected to the last named arm for returning the shutters to normal position, and a pivoted key connected to said rod for manually opening the shutters should the electro-magnet become inoperative, substantially as described.

In witness whereof I have hereunto set my hand in the presence of two subscribing witnesses.

EMILE LEON PAUL PAILLIARD-TURENNE.

Witnesses:
R. H. BRANDON,
A. V. DAVIES.

---

Copies of this patent may be obtained for five cents each, by addressing the "Commissioner of Patents, Washington, D. C."